June 3, 1930. J. D. MAJOR 1,762,024
AWNING CLIP
Filed July 8, 1929
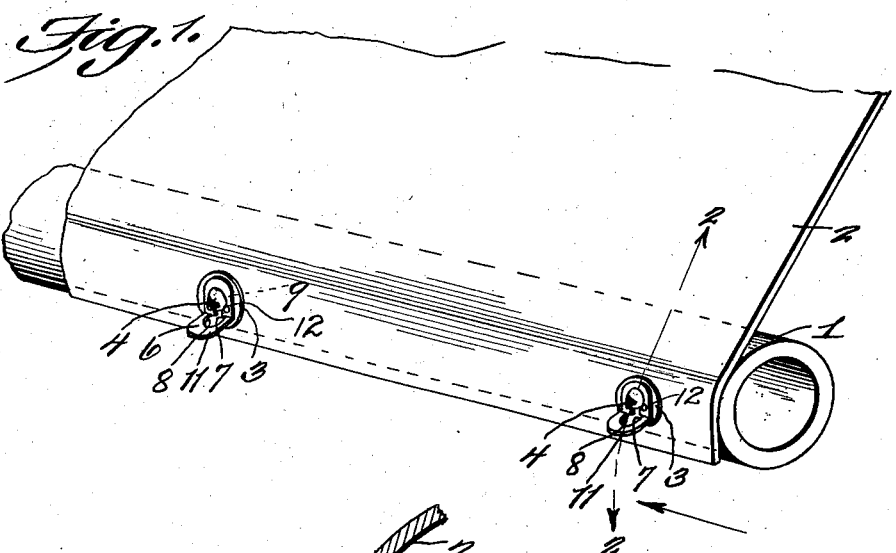
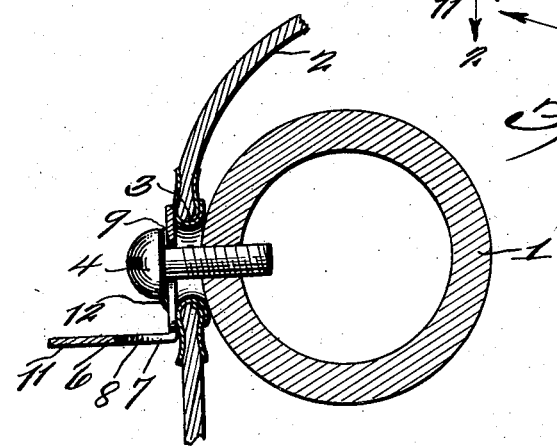
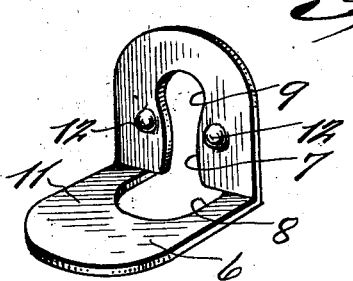
Joseph D. Major INVENTOR
BY Victor J. Evans
his ATTORNEY Patented June 3, 1930

1,762,024

UNITED STATES PATENT OFFICE

JOSEPH D. MAJOR, OF PHILADELPHIA, PENNSYLVANIA

AWNING CLIP

Application filed July 8, 1929. Serial No. 376,776.

The present invention relates to an improved awning clip, and the main purpose of the invention is to provide an article of this kind which may be manufactured for a relatively low cost and sold at a reasonable profit.

Heretofore the edges of awnings, which edges are provided with eyelets, were fastened to the awning bar or rod by means of screw eyes and similar devices, which necessitate considerable time to remove the screw eyes, the detachment of the awning from the rod being very tedious and tiresome.

It is therefore another purpose of the present invention to provide a quick detachable clip, one that will only necessitate a slight pressure on the clip in order to disengage it and remove it from the head of a screw, therefore maintaining the edge portion of the awning quickly detachable from the awning rod or pole.

One of the features of the invention is the provision of an awning clip, as an article of manufacture, comprising a clip body of relatively thin metal bent upon itself, with the bent parts at right angles to each other, with a slot formed in the body, and through the larger end of the slot the head of a screw may pass, so that the shank of the screw may position within the smaller end of the slot, there being protrusions formed in one of the bent parts of the clip to ride under the head of the attaching screw and frictionally engage against the lower edge of the head, in such wise as to retain the clip in position on the attaching screw, and hence retain the awning in position.

It is to be understood that the particulars herein given are in no way limitative, and that while still keeping within the scope of the invention, any desired modification of details and proportions may be made in the constructions of the appliance according to circumstances.

The invention comprises further features and combination of parts to be hereinafter set forth, shown in the drawings and claimed.

In the drawings:

Figure 1 is a view in perspective of a portion of an awning pole or bar, showing the awning attached thereto by means of the anchoring screw and clip.

Figure 2 is a sectional view on line 2—2 of Figure 1, showing how the eyelet of the awning engages over the head of the attaching screw, and how the clip also engages the head and the shank of the screw.

Figure 3 is a detailed perspective view of the clip.

Referring to the drawings, 1 identifies an awning pole or rod, which may be any suitable shape in cross section, and 2 is the awning, which is provided along its edge portion with a number of eyelets 3. However only two eyelets are shown, and as illustrated these eyelets 3 engage over the heads of screws 4. These screws may be either wood screws, machine screws or the like. Said screws are carried by the awning rod or bar, and if desired lugs may be substituted for the screws, it to be understood that the lugs are to have heads similar to those shown.

As previously stated the eyelets 3 pass over the heads of the screws as illustrated, and then the clip 6 is attached.

The clip 6 comprises a clip body made of any suitable thin metal, and in so far as the contour of the edges of the clip is concerned, such contour may be any configuration.

The clip body is bent upon itself, and the bent portions extend at right angles to each other. The clip body is provided with an elongated slot 7, which is formed in the two bent parts of the clip. One end of the slot 7 is enlarged as identified at 8, while the other end 9 of the slot is reduced, as identified. The reduced end of the slot receives the shank of the attaching screw 4, when the clip is applied, while the enlarged end 8 of the slot is formed in the finger piece 11 of the clip. The enlarged end 8 of the slot is of a size sufficient to permit of the passage of the head of the attaching screw 4, in order that the shank of the attaching screw may position in the smaller end of the slot.

To attach the clip the finger piece portion 11 of the clip may be grasped between the thumb and fore-finger, and then the clip placed adjacent the eyelet of the awning. By a downward movement of the clip the head of the attaching screw may pass through the larger end of the slot, until the shank positions in the smaller end of the slot, so that the head of the attaching screw may overlie the marginal portions of the smaller end of the slot.

Adjacent the marginal edges of the smaller end of the slot, the clip is provided with protrusions struck up from the face of the clip. These protrusions 12 ride against the under face of the head of the attaching screw and frictionally engage with the lower margin of the head of the screw, and act to retain the clip in position on the screw, thereby holding the eyelet on the attaching screw and holding the awning down and in secure position.

The invention having been set forth, what is claimed is:

1. As an article of manufacture, an awning clip comprising a clip body bent upon itself, with its bent portions at right angles to each other, one bent portion constituting a finger piece, the other bent portion constituting a screw engaging part, an elongated slot formed in the body of the clip and having a narrow end portion formed in the screw engaging part and provided with an enlarged portion in the finger piece, the enlarged portion permitting of the passage of the head of a screw, to allow the shank of the screw to engage in the smaller portion of the slot, whereby an awning having an eyelet may be held attached to said screw.

2. As an article of manufacture, an awning clip comprising a clip body bent upon itself, with its bent portions at right angles to each other, one bent portion constituting a finger piece, the other bent portion constituting a screw engaging part, an elongated slot formed in the body of the clip and having a narrow end portion formed in the screw engaging part and provided with an enlarged portion in the finger piece, the enlarged portion permitting of the passage of the head of a screw, to allow the shank of the screw to engage in the smaller portion of the slot, whereby an awning having an eyelet may be held attached to said screw, the marginal portions of the smaller end of the slot having means comprising protrusions to frictionally engage with the lower edge of the head of the screw to retain the clip in position.

3. In an awning clip, the combination with an awning rod having an added projection, of an awning having an eyelet adjacent its margin, and through which the headed projection may engage, a clip comprising right angle parts, one constituting a projection engaging member, the other constituting a finger piece, said clip having an elongated slot, said slot having a restricted portion formed in the projection engaging part and an enlarged portion formed in the finger piece part, the latter portion permitting of the passage of the head of the projection, whereby the shank of the projection may engage in the restricted portion of the slot.

4. In an awning clip, the combination with an awning rod having an added projection, of an awning having an eyelet adjacent its margin, and through which the headed projection may engage, a clip compromising right angle parts, one constituting a projection engaging member, the other constituting a finger piece, said clip having an elongated slot, said slot having a restricted portion formed in the projection engaging part and an enlarged portion formed in the finger piece part, the latter portion permitting of the passage of the head of the projection, whereby the shank of the projection may engage in the restricted portion of the slot, and means adjacent the marginal side edges of the restricted portion of the slot to frictionally engage against the lower edge of the head of the projection to hold the clip and awning in position.

In testimony whereof he affixes his signature.

JOSEPH D. MAJOR.